Patented Mar. 21, 1933

1,902,477

UNITED STATES PATENT OFFICE

HENRY WILLIAM HUGH WARREN, OF COVENTRY, REGINALD NEWBOUND, OF RUGBY, AND ALFRED T. WARD, OF DERBY, ENGLAND, ASSIGNORS TO GENERAL ELECTRIC COMPANY, A CORPORATION OF NEW YORK

MANUFACTURE OF SYNTHETIC RESINS

No Drawing. Application filed July 31, 1930, Serial No. 472,184, and in Great Britain November 29, 1929.

This invention relates broadly to the manufacture of synthetic resins and more particularly to resins of the polyhydric alcohol-polybasic acid type, which resins are also known as alkyd resins. This invention is especially concerned with a process for reducing the time required to polymerize resins of this type from the fusible to the infusible state and to produce a product which is free from cavities or blisters.

It is well known that resins of the alkyd type cannot be polymerized quickly in layers of any considerable thickness without the formation of cavities or blisters. In consequence of this, sheets or slabs of this resin are usually polymerized at temperatures of between 100° and 140° C., but under these conditions the process is a very lengthy one, requiring heat treatment of from one to six months depending on the thickness of the slabs.

The principal object of the present invention is to reduce the time required to polymerize this resin and to produce a resulting product which is free from cavities or blisters. To accomplish this, fusible alkyd resins are treated with an aliphatic or aromatic acid chloride, for example acetyl chloride, benzoyl chloride and the like or an anhydride of a monobasic carboxylic acid, such as acetic anhydride and the like. The excess acid chloride or anhydride is removed by distillation under ordinary atmospheric or reduced pressure.

This invention may be better understood from the following examples, which are given to illustrate the invention and not to limit it to any of the conditions or proportions given.

To produce a resin which is quickly polymerizable, 100 parts by weight of fusible glycerol-phthalate resin may be treated with 10 parts by weight of acetic anhydride at 120° to 130° C. for a period of about one hour. The resulting product is subsequently heated in a vacuum at 125° to 130° C. to remove the excess acetic anhydride. Polyhydric alcohol-polybasic acid resins other than glycerol-phthalate resin may be treated in a similar manner.

As another specific example of our process we mention the following:

100 parts by weight of glycerol-phthalate oleic acid resin is treated with 15 parts by weight of benzoyl chloride at 130° to 140° C. for a period of 60 minutes. The resulting product is subsequently heated in vacuo at 140° to 150° C. in order to remove excess benzoyl chloride.

The following resinous materials may also receive a similar treatment:

Mixtures of different polybasic acid-polyhydric alcohol resins, e. g. a mixture of glycol succinate and glycerol phthalate; resinous complexes prepared by reacting together two or more different polybasic acids with two or more polyhydric alcohols, e. g. a resinous complex obtainable by reacting a mixture of glycerol and glycol with a mixture of phthalic and citric acids; plasticized polybasic acid-polyhydric alcohol resins or plasticized mixtures of resinous complexes, e. g. glycerol phthalate resin plasticized with oleic acid; compounded resinous materials obtainable in accordance with the method described in British Patent No. 308,671 by simply heating at an elevated temperature plasticized or unplasticized polybasic acid-polyhydric alcohol resins, mixtures thereof, or resinous complexes with natural or synthetic resins, e. g. glycerol phthalate resin is heat treated with colophony.

What we claim as new and desire to secure by Letters Patent of the United States is:

1. The process of quickly polymerizing a fusible resin of the alkyd type which consists in heating said resin in the presence of an organic acid chloride.

2. The process of quickly polymerizing a fusible resin of the alkyd type which consists in heating said resin with an anhydride of a monobasic carboxylic acid.

3. The process of quickly polymerizing a fusible resin of the alkyd type which consists in heating said resin in the presence of acetyl chloride.

4. The process of quickly polymerizing a fusible resin of the alkyd type which consists in heating said resin in the presence of acetic anhydride.

5. The process of quickly polymerizing a fusible glycerol-phthalate resin which consists in heating about 100 parts by weight of said resin with about 10 parts by weight of acetic anhydride at 120° to 130° C. for about one hour and subsequently heating the resulting product in a vacuum at 125° to 130° C. to remove the excess acetic anhydride.

6. The process of quickly polymerizing a fusible glycerol-phthalate-oleic acid resin which consists in heating about 100 parts by weight of said resin with about 15 parts by weight of benzoyl chloride at 130° to 140° C., for about 60 minutes and subsequently heating the resulting product in a vacuum at 140° to 150° C. to remove the excess benzoyl chloride.

7. The process which comprises heating a fusible alkyd resin with a substance of the class consisting of organic acid chlorides and anhydrides of monobasic carboxylic acids to accelerate the conversion of the resin from the fusible to the infusible state.

8. The process which comprises heating a glycerol-phthalate resin in the fusible state with a substance of the class consisting of organic acid chlorides and anhydrides of monobasic carboxylic acids to accelerate the conversion of the resin from the fusible to the infusible state and removing any excess of said substance present.

In witness whereof, we have hereunto set our hands this 21st day of July, 1930.

HENRY WILLIAM HUGH WARREN.
REGINALD NEWBOUND.
ALFRED T. WARD.